(12) United States Patent
Manders et al.

(10) Patent No.: US 12,146,856 B2
(45) Date of Patent: Nov. 19, 2024

(54) SURFACE TEXTURE OF MANUFACTURED PARTS

(71) Applicant: DarkVision Technologies Inc., North Vancouver (CA)

(72) Inventors: Graham Manders, North Vancouver (CA); Jay Roderick Hope, Vancouver (CA)

(73) Assignee: DarkVision Technologies Inc., North Vancouver (CA)

( * ) Notice: Subject to any disclaimer, the term of this patent is extended or adjusted under 35 U.S.C. 154(b) by 0 days.

(21) Appl. No.: 18/703,718

(22) PCT Filed: Nov. 20, 2023

(86) PCT No.: PCT/IB2023/061705
§ 371 (c)(1),
(2) Date: Apr. 23, 2024

(87) PCT Pub. No.: WO2024/110848
PCT Pub. Date: May 30, 2024

(65) Prior Publication Data
US 2024/0337626 A1    Oct. 10, 2024

(30) Foreign Application Priority Data
Nov. 22, 2022 (GB) ...................... 2217479

(51) Int. Cl.
*G01N 29/04* (2006.01)
*G01N 29/26* (2006.01)
(Continued)

(52) U.S. Cl.
CPC ......... *G01N 29/041* (2013.01); *G01N 29/262* (2013.01); *G01N 29/265* (2013.01);
(Continued)

(58) Field of Classification Search
CPC .. G01N 29/041; G01N 29/262; G01N 29/265; G01N 29/4463; G01N 2291/0289; G01N 29/106; G01N 2291/2634
(Continued)

(56) References Cited

U.S. PATENT DOCUMENTS 5,841,889 A * 11/1998 Seyed-Bolorforosh ...................... G01S 7/52046
600/443
8,531,915 B2 * 9/2013 Ammar ............... G01S 15/8904
367/87
(Continued)

FOREIGN PATENT DOCUMENTS

EP    3605081 A1    2/2020
GB    2612093 A     4/2023
(Continued)

OTHER PUBLICATIONS

International Search Report and Written Opinion received for PCT Application No. PCT/IB2023/061705, mailed on Mar. 28, 2024, 10 pages.

*Primary Examiner* — Jacques M Saint Surin

(57) ABSTRACT

A device and method for non-destructive testing of an object, such as a pipe, well casing, plane wing, rail track, weldment, bridge or manufactured part. A phased array of ultrasonic transducers moves relative to the part in one direction, while transmitting a steered wave in another direction to capture the texture from the object's surface. Diffuse and specular components of the received reflection signals are separated and beamformed for visualization. The object is then viewable as a 3D image with a texture map of the object's surface.

20 Claims, 15 Drawing Sheets

(51) Int. Cl.
　　　*G01N 29/265*　　　(2006.01)
　　　*G01N 29/44*　　　(2006.01)

(52) U.S. Cl.
　　　CPC . *G01N 29/4463* (2013.01); *G01N 2291/0289* (2013.01); *G01N 2291/106* (2013.01); *G01N 2291/2634* (2013.01)

(58) Field of Classification Search
　　　USPC .......................................................... 73/618
　　　See application file for complete search history.

(56) References Cited

U.S. PATENT DOCUMENTS

| | | |
|---|---|---|
| 9,127,998 B1 | 9/2015 | Guldiken |
| 11,487,006 B2 * | 11/2022 | Fraschini ............ G01S 15/8997 |
| 2011/0199342 A1 * | 8/2011 | Vartanian ............ G06F 3/04845 |
| | | 715/702 |
| 2013/0083628 A1 | 4/2013 | Qiao |
| 2020/0249203 A1 | 8/2020 | Manders et al. |
| 2022/0155440 A1 * | 5/2022 | Kruse .................. G01S 15/8977 |
| 2022/0252547 A1 | 8/2022 | Lepage |

FOREIGN PATENT DOCUMENTS

| | | | | |
|---|---|---|---|---|
| GB | 2624639 | * | 5/2024 | ........... G01N 29/043 |
| WO | 2016201583 A1 | | 12/2016 | |

* cited by examiner

| Reference | Terminology |
|---|---|
| 1 | Imaging Tool/PIG/Handheld NDT |
| 2 | Object/Casing/Pipeline/ Manufactured Part |
| 3 | Fluid coupling |
| 4 | Object's first surface |
| 5 | Diffuse reflectors/ surface features |
| 12 | Ultrasound Phased Array / Transducer |
| 13 | Transmit Wavefront |
| 14 | Tool processing circuit |
| 15, 21 | Specular reflection; specular receive aperture |
| 17 | Traced Rays |
| 18 | Filter band |
| 19 | Remote computing system |
| 20, 16 | Diffuse reflections; diffuse receive aperture |
| 32 | Ultrasound Driver(s) |
| 33 | Operations Telemetry/Communications link |
| 34 | Tool telemetry /communication link |
| 35 | FPGA |
| 36 | Tool Memory |
| 37 | Remote image storage |
| 38 | Tool Processor |
| 64 | Perforations |
| 65 | Geometric model |
| 66 | Filtered texture map |
| 68 | Object defect |
| 70-78 | Process steps |
| Z | Axial direction, relative motion of transducer - part |
| X, R | Sensor Offset direction (Cartesian, cylindrical coordinates) |
| Y, $\vartheta$ | Lateral, azimuth direction (Cartesian, cylindrical coordinates) |
| $\phi$ | Incidence Angle (in R-Z plane) |
| $\varphi$ | steering angle (in R, $\vartheta$ or X, Y plane) |

Fig. 14

SURFACE TEXTURE OF MANUFACTURED PARTS

RELATED APPLICATION

This application is a U.S. National Phase Patent Application of International PCT Patent Application No. PCT/IB2023/061705, filed on Nov. 11, 2023, which claims the benefit of priority to United Kingdom Application No. 2217479.1, filed on Nov. 22, 2022. The above-referenced patent applications are herein incorporated by reference in their entireties.

FIELD OF THE INVENTION

The invention is directed to non-destructive testing of objects using ultrasonic tools, particularly for capturing a surface texture of manufactured parts.

BACKGROUND

Ultrasonic transducers have been used to inspect objects for deflects such as cracks, poor welds, voids, pores, and holes. There are various applications for this in industrial inspection, such as pipelines, well casings, and mechanical parts. The transducer is typically closely coupled to the object's surface and a wave is transmitted into the object. Reflections from surfaces and these defects return to the transducer, now operating in receive mode. The reflection signals are converted to digital signals and processed to determine the locations of the internal defects from the times and path taken by the transmitted and reflected waves. The information and images are generally of depth features and so the probe may be called a depth (or thickness) probe.

In downhole applications, it is also known to capture the object's surface features by using an angled probe. As taught in WO2016201583A1 entitled "Ultrasonic imaging device and method for wells" to Darkvision Technologies Inc, and briefly illustrated here in FIG. 2, a transducer with a transmission face inclined $\phi$ (e.g., 25°) to the surface normal will receive diffuse reflections 20 from surface scatterers, which may correspond to pits, corrosion, or even the metal finish, if the transmitted wavelength is small enough. The remaining and majority acoustic energy is in the form of specular reflections 15 that continue axially away from the transducer. Each frame captures a ringed slice of the surface reflections and as the tool moves axially through the tubular 2, it captures further image slices that can be stacked together to capture a cylindrical image of the casing surface. Such an angled probe may be called an imaging probe.

Thus, two probe types (depth and imaging) are needed to capture depth and surface features. In Non-Destructive Testing (NDT) of manufactured parts and of pipelines, surface images are not captured, as these are not wanted and would make the tool twice as large.

SUMMARY

To provide a surface texture layer for manufactured parts, a new ultrasound transmission and data processing method are provided. This method improves the visualization of such parts. Certain surface defects that are determinable directly from this texture and depth defects are more intuitive to analyze.

In accordance with a first aspect of the invention, there is provided a method of ultrasonic non-destructive testing of an object, comprising the steps of: moving a phased array ultrasonic transducer relative to the object in a first direction; repeatedly transmitting a steered coherent wave towards the object using said transducer; receiving signals reflected from the object using said transducer and storing the received signals in memory; beamforming diffuse components of the received signals to determine pixel values for a surface of the object; and creating a texture map of the object based on said pixel values.

In accordance with a second aspect of the invention, there is provided a system for ultrasonic non-destructive testing of an object, the system comprising: a housing mounting a phased array ultrasonic transducer; conveying means for moving the transducer relative to the object in a first direction; a drive circuit electrically connected to the transducer and arranged to repeatedly transmit a steered coherent wave towards the object; a receiving circuit for receiving signals reflected from the object using said transducer; a memory for storing the received signals; and a processor. The processor processes instructions for a) beamforming diffuse components of the received signals to determine pixel values for a surface of the object and b) creating a texture map of the object based on said pixel values.

Preferred embodiments may further comprise: displaying a rendering of the object using the texture map; filtering out or attenuating specular components of the stored received signals, preferably using a mask of receive channels and sample times that correspond to calculated specular angles of reflection; excluding channels of said transducer corresponding to specular reflections during the step of receiving reflected signals; beamforming specular components of the received signals to create a geometric model of the surface of the object; beamforming and ray tracing compression and shear components of the received signals to detect defects in the object; beamforming specular signals in the received signals to determine a geometry of said surface and using that determined geometry to identify locations of diffuse reflectors on said surface; transmitting plural additional coherent waves that are normal to the surface of the object and processing their reflections to create a geometric model of the object; normalizing intensity of signals for transducer elements to remove transducer inconsistency; or attenuating received signals above a threshold amplitude.

The method and system may be further characterized wherein: the steered coherent wave is a defocused or diverging wave; the coherent wave is steered at an angle between 12-25° off a Normal of the surface of the object, preferably steered at an angle 18-22°; a steering axis of the coherent wave is substantially orthogonal to the first direction; beamforming diffuse components comprises tracing rays from said surface to the transducer, excluding specular rays; the coherent wave is transmitted in a plane substantially orthogonal to the first direction; a transmission face of the transducer is normal to said surface of the object; the receiving circuit stores an exclusion mask for excluding certain channels of said transducer corresponding to specular reflections; the transducer is a linear array of ultrasonic elements whose longitudinal axis is substantially perpendicular to the first direction.

BRIEF DESCRIPTION OF THE DRAWINGS

Various objects, features and advantages of the invention will be apparent from the following description of embodiments of the invention, as illustrated in the accompanying drawings. The drawings are not necessarily to scale, emphasis instead being placed upon illustrating the principles of various embodiments of the invention.

FIG. 14 is a table of reference numbers and their terminology, as used herein.

DETAILED DESCRIPTION

Figure 1:
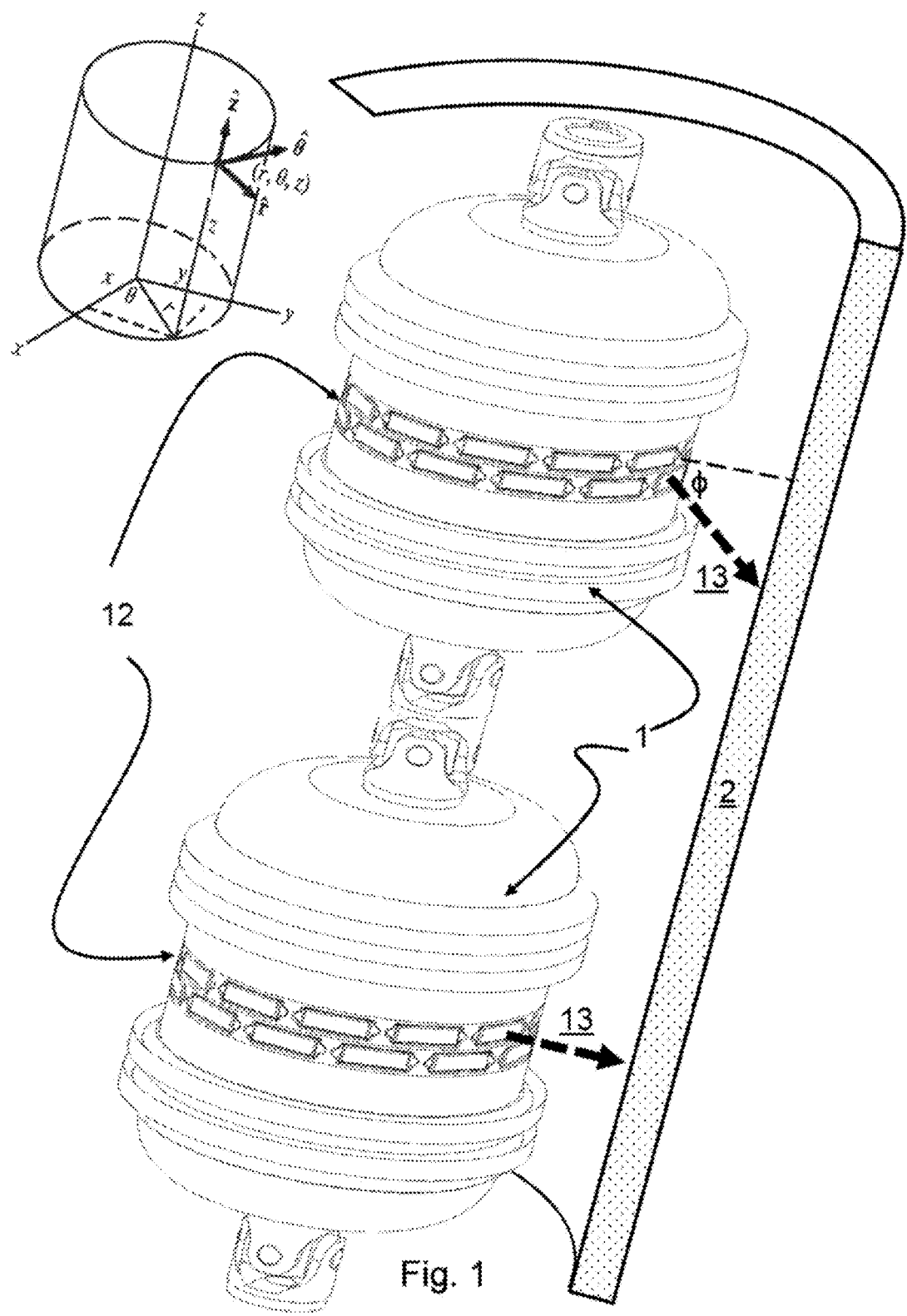
FIG. 1 is a perspective view of an inline imaging tool having two types of ultrasonic transducers.

With reference to the accompanying figures, devices and methods are disclosed for capturing, processing, and storing ultrasonic data to create a surface texture of an object. This Non-Destructive Testing (NDT) is particularly relevant to manufactured objects with continuous surfaces, such as machined parts, pipelines, metal sheets and slabs, turbine blades, aircraft wings, and well casings.

Advantageously, this imaging can be done with a thickness-oriented probe, without needing a second type of probe being inclined from the surface normal, as is normally used to capture surface reflections. For example, the inline imaging tool 1 in FIG. 1, may be shortened to the bottom module only, having non-inclined transducers 12 to transmit wave 13, shown here Normal to the tubular object 2. The transmit wave 13's angle of incidence $\phi$, with respect to the direction of motion in Z, is zero.

Instead, the phased array transducer 12 is steered laterally, with respect to the direction of motion. This would be into the page of FIG. 1 and better illustrated in FIGS. 3B and 3C by steered wavefront 13, creating angle of incidence $\varphi$. The wave may be seen as steered within the plane (X, Y or R, $\vartheta$) that is perpendicular to the direction of relative motion (Z). Thus, this angle of incidence $\varphi$ differs from the prior use of angle of incidence $\phi$ (See FIG. 2), which is inclined in the direction of movement, (i.e. within the Z-R or Z-X plane).

Figure 9:
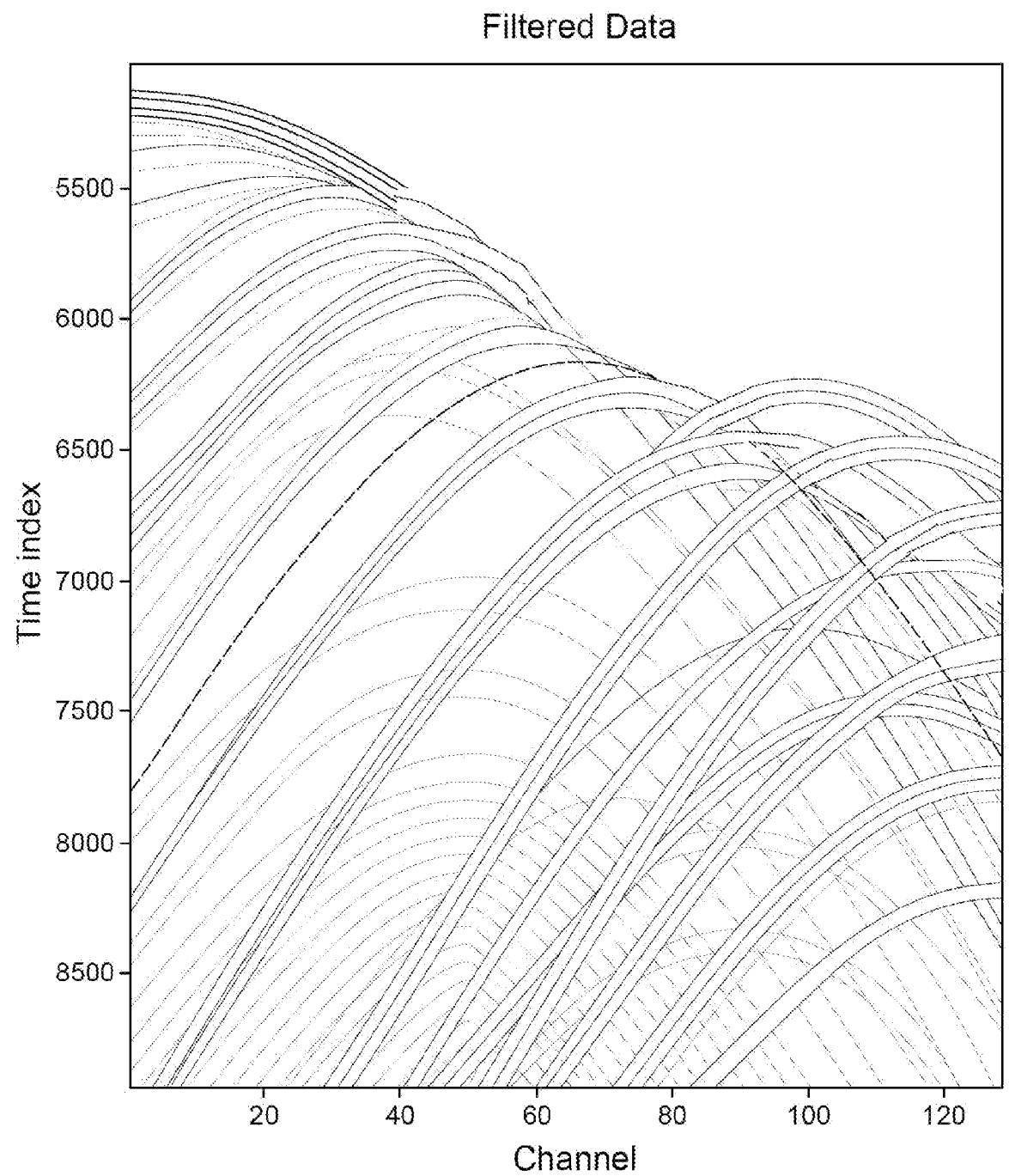
FIG. 9 is a plot of channel data filtered by single preferential slope for plane-wave destruction.

FIG. 9 provides a flowchart for the overall process. The tool's transducer moves in a direction Z relative to the object (step 70). The transducer continually steers waves lateral to the direction Z during movement (step 72) to insonify the whole target area of the object. Reflections from the object return to the transducer, are digitized, and stored in memory (step 73). A computer processes the reflections into separate diffuse and specular components (step 74). Each of the components are beamformed (step 75). The computer may create a geometric model from the beamformed specular components (step 76). The computer may create a texture map from the beamformed diffuse components (step 77). The computer may render a 3D image using the geometric model and texture map (step 78).

If transmission is steered at too high an angle, there will be little penetration into the object, whereas at too little an angle, the processor cannot easily separate specular from diffuse reflections (or rather have few diffuse receivers to use, after removing the specular receivers). A steering angle of 12-24°, more preferably 18-22°, is optimal for crack detection, while also allowing surface features to be distinguishable. The samples in the channel data which will contribute energy to a certain location in the region of interest (for beamforming) will be those whose travel times are tangent to the diffraction travel time curves which are being used to sum in the beamforming algorithm.

At 0° (i.e., not steered), the tangent to the reflection events and to the diffraction events are located in the same samples in the channel data, but as the transducer steers the incident beam, they separate. Therefore, the circuit is only able to filter reflections without damaging the stationary (highest contribution point) when steering the beam.

A steering angle above 24° will be beyond the critical angle for many imaging modes, resulting in very little penetration. In experimental analysis, there is enough penetration to perform T-T reflection beamforming, when the steering angle is between 16° and 24°. An 18° steering angle provides the best penetration for T-waves in mild steel.

The optimal range will depend on the magnitudes of the sensing system used, where the above ranges apply for an exemplary sensor system of: a 4 Mhz center frequency transducer; a mild steel object; a 40 Mhz sampling frequency; and where surface features of micron size are to be detected.

The transmission steering plane is preferably orthogonal to the direction of relative movement (Z), in order to maximize swept area. If that plane rotates were closer to parallel with that direction of movement, surface detection would still work but less width of the object would be captured per frame.

Figure 3A:
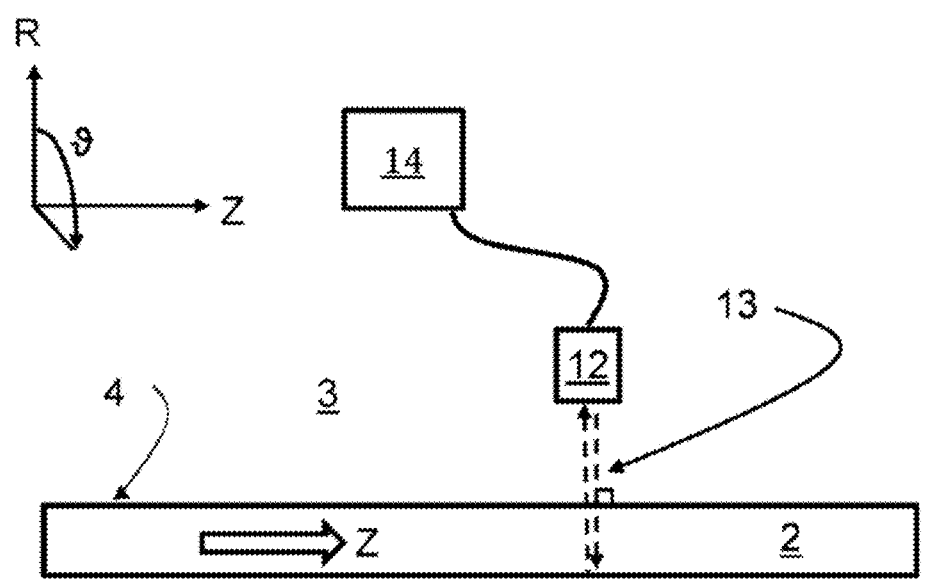
FIG. 3A is a side-view of a transducer inspecting an object.
Figure 3B:
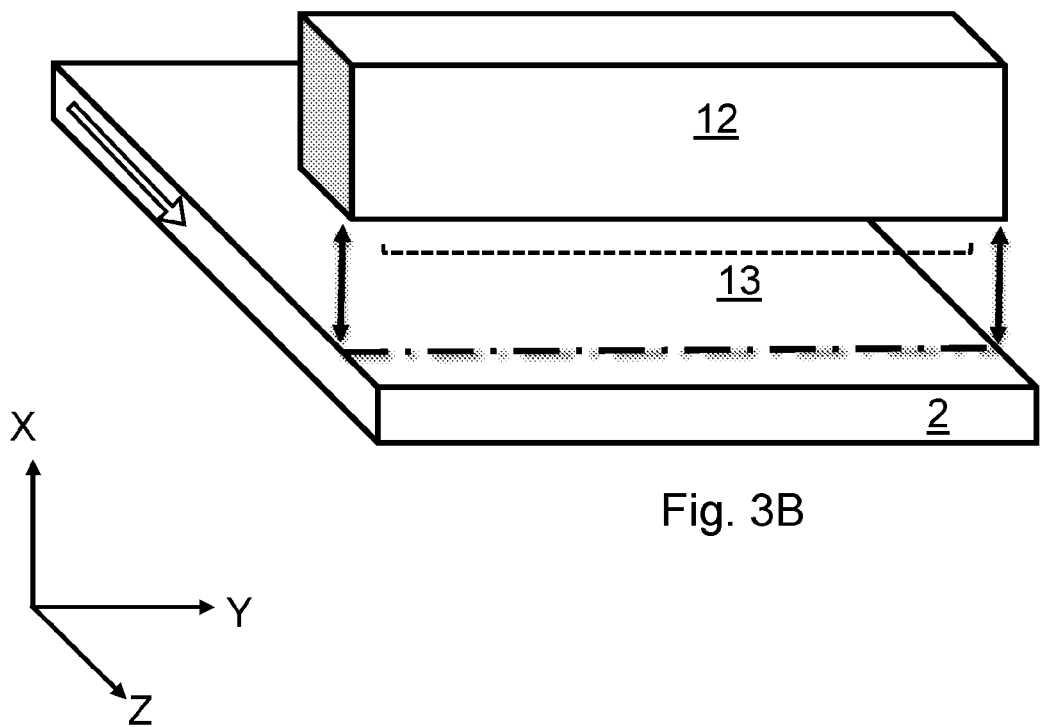
FIG. 3B is a perspective-view of a transducer inspecting an object using a first, unsteered waveform.
Figure 3C:
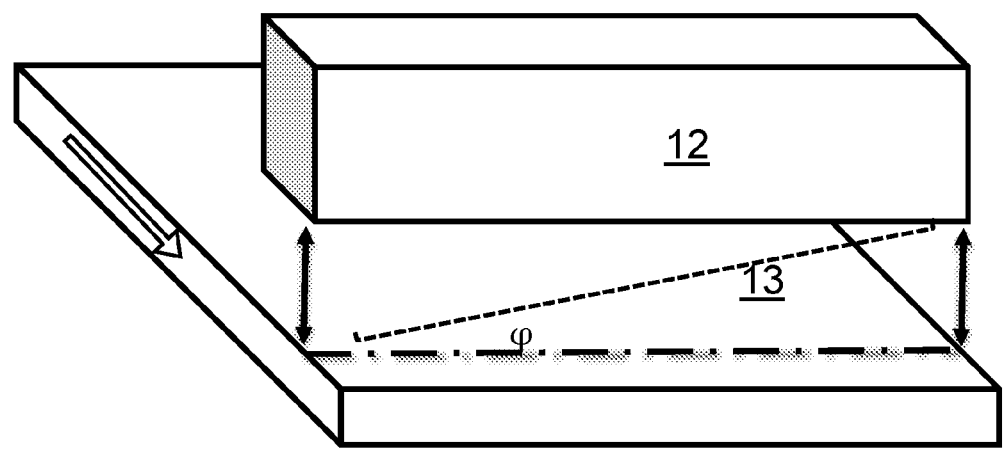
FIG. 3C is a perspective-view of a transducer inspecting an object using a second, steered waveform.
Figure 3D:
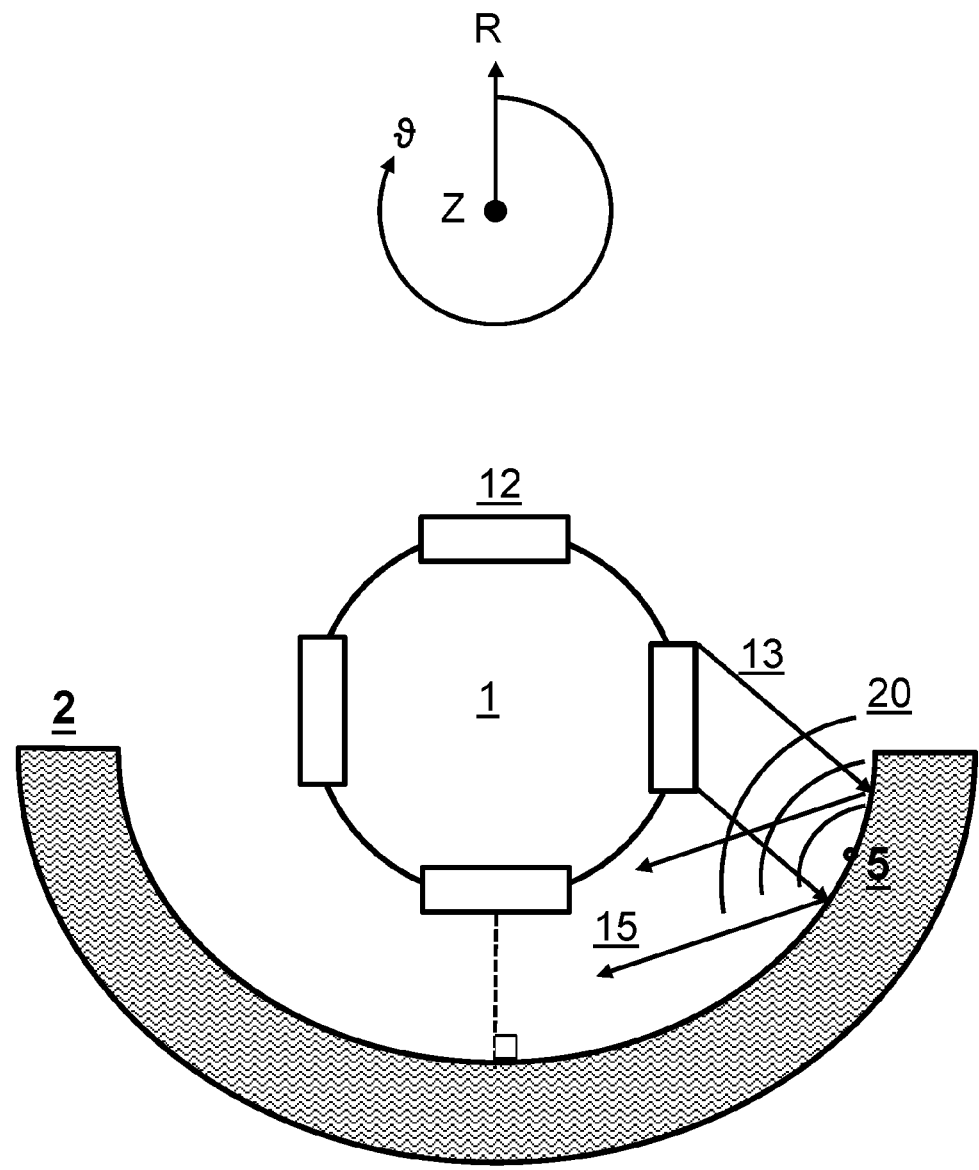
FIG. 3D is an end-view of a transducer inspecting a curved object.

It is useful to define a coordinate frame for reference, illustrated in FIGS. 1, 3A, and 3D, in which coordinates may be inherently cylindrical (R, $\vartheta$, Z) or Cartesian (X, Y, Z). There is relative motion Z of the transducer 12 with respect to the inspected object 2. The transducer stands off from the object in dimension R or X. $\vartheta$ represents the azimuth or circumference dimension for cylindrical tools or objects, such as pipes. Y is the dimension perpendicular to motion and standoff. The wavefront 13 is steered laterally in azimuth $\vartheta$ or Y dimensions. A linear transducer array will usually have a major axis extending in $\vartheta$ (azimuthally) or Y (laterally) to allow for said steering. The face of the transducer (aka the optical plane) is generally parallel to the plane of the object (i.e., the surface at the locale being inspected). The transducer's elevation is in the Z direction (i.e., movement of the tool relative to the object).

Figure 2:
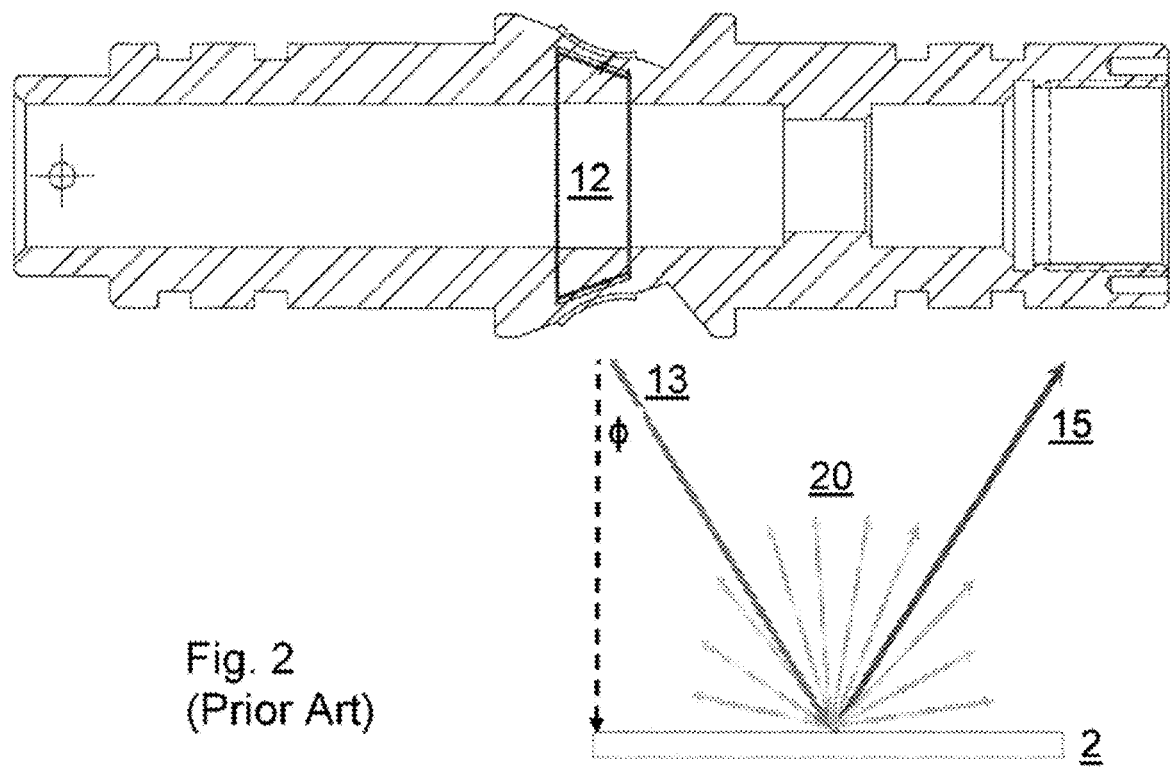
FIG. 2 is an illustration of general reflection properties and their use in a known imaging device for surface imaging according to a prior system.

For comparison, the wavefront 13 in FIG. 3A is not steered and returns specular reflections to accurately detect the surfaces and depth features. These may be mapped using the time-of-flight (ToF), given the Speed of Sound (SoS) of the coupling fluid and object, to create a 3D geometric model of the object. There will be intense reflections from the first surface, back surface, and defects of object 2. As seen in FIG. 2, minor surface features cause diffuse reflections 20 but these are weak compared to specular reflections 15 and difficult to separate in time from them.

Thus, the present system transmits a planewave that is steered off-Normal to the object's surface by some angle φ. In this case, much of the specular energy reflects past the transducer elements, leaving the diffuse reflections 20 comparatively prominent with signals that can be separated in time, using a high sampling frequency (e.g., 50 Mhz).

A focused, steered wave could be used to return reflections from a precise spot on the object. The wave is repeated with its focus moved along the surface to capture all spots of interest on the object. A faster approach is to transmit a coherent, unfocused wavefront that broadly insonifies a large portion of the surface per pulse. The reflections returned thus reflect from many diffuse reflectors 5, which complicates the later image processing. This unfocused wavefront is often called a planewave in the art. As the present system may deal with curved objects, a curved or arcuate planewave is often more suitable.

For simplicity, FIGS. 3A-3C illustrate a flat transducer array imaging a flat object using a flat planewave. The skilled person will appreciate that other shapes and contours can be imaged, for example, as shown in FIG. 3D, especially when working with tubulars, propeller blades, and aircraft wings. For example, there may be a curved transducer array, circular pipe, or arcuate wavefront, necessitating modifications in transmit phase delays, beamforming, and geometric building.

The skilled person will appreciate that some amount of convergence or divergence in the wavefront is possible and still insonify a large area with many diffuse reflectors 5, which are later separated to image that area. The transmit beam steering and receive beamforming may use circuit processing, as known in the art, and work for a range of transducers, objects, or wavefront shapes.

Figure 4A:
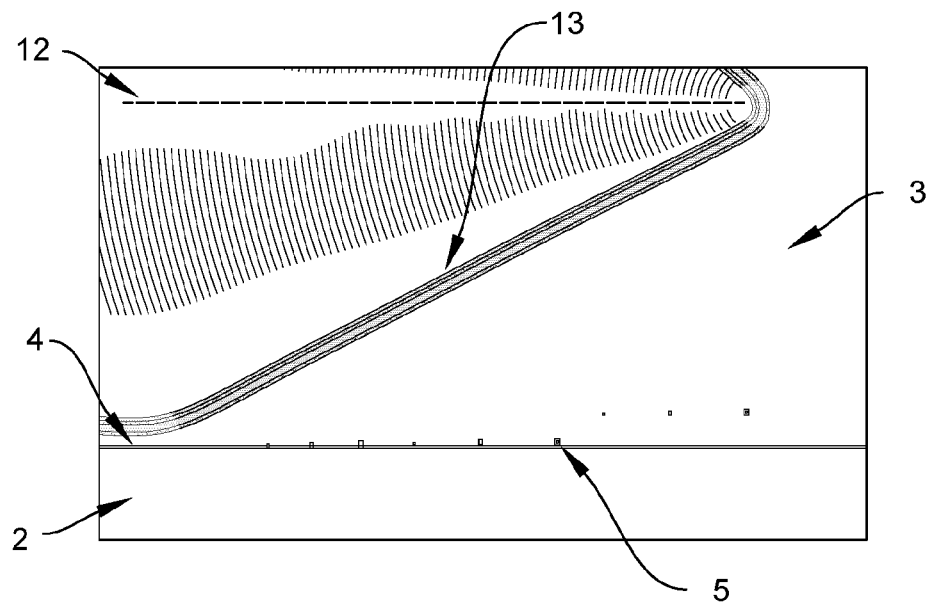
FIG. 4A is a simulation of a transmitted wavefront steered off normal with respect to an object's surface.
Figure 4B:
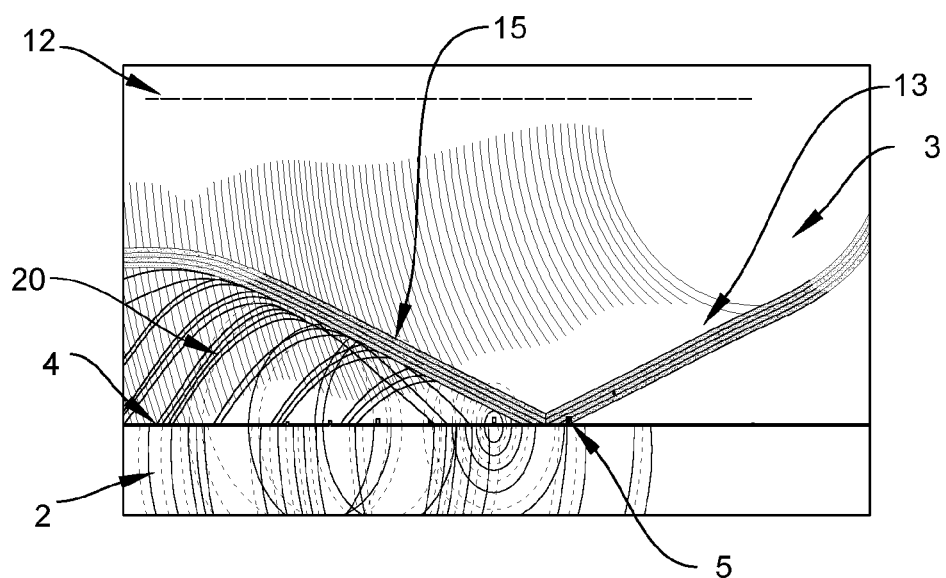
FIG. 4B is a simulation of reflections from the object's surface, including diffuse scatterers.

FIG. 4A is a simulation of a transmitted wavefront 13 moving thru fluid 3 towards the object 2, steered at some angle of incidence. FIG. 4B illustrates the waves a moment later, as the specular waves 15 reflect off the surface 4 at a mirrored angle of incidence, while the diffuse reflectors 5 reflect back waves 20 omnidirectionally. The reflections 15, 20 are received by the array 12 but importantly these captured reflections differ in time and element location on the array.

Filtering Reflections

Figure 13:
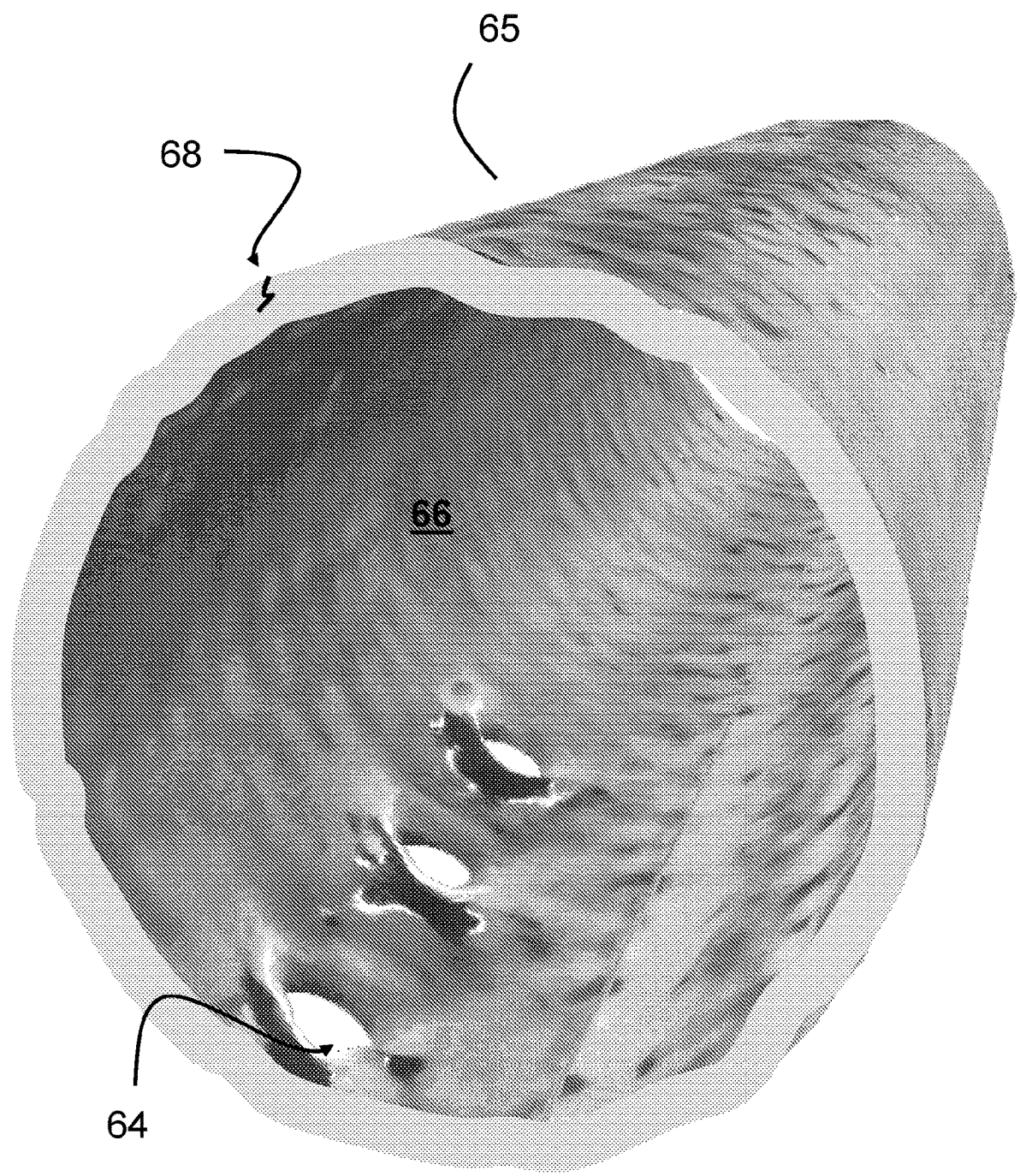
FIG. 13 is a rendering of an imaged part fitted with a geometric model and surface texture.

The received reflection signals in their raw form contain several reflection types, including diffuse, specular, compression and shear components. The diffuse components reflect off micro features at the surface, while specular components reflect off the general surface shape. Compression and shear components represent the two types of waves that enter into the object, bouncing off surfaces until they return to the transducer. Shear waves, in particular, are useful for detecting defects in objects. The reflection signals are thus processed to separate diffuse, specular, compression and shear components, using one or more of them to create images that are combinable to create the final rendering of the object. The diffuse components are used to create the surface texture map; the specular components are used to render the geometry of the object's inner surface; and the shear components are used to identify defects in the object. FIG. 13 provides a rendering 3D perspective of a tubular object having a 3D geometric model 65, which has been overlaid with texture map 66. This output provides detailed information about perforation 64 and defect 68.

The relative strength of each component will depend on the angle of incidence, determined by the steering angle chosen to transmit. As discussed above, a steering angle of 18-24° provides a reasonable amount of each of these components. One of these components may be completely filtered out; attenuated and combined with the diffuse reflections in the final image; or processed separately to create their own layer in the object's overall rendering. There are several concepts for separating of diffuse and specular components that are discussed herein. The device and method may: a) select which receiver channels are to be received and stored in real-time during inspection (exemplified by FIG. 5); b) attenuating (or simply muting) specular reflection data based on brightness (exemplified by FIG. 7); c) find a single preferential slope (either known from plane wave math or obtained via methods), and apply plane-wave destruction (exemplified by FIG. 9); or find a preferential slope for each channel (e.g., using a cross-correlation approach) and apply plane-wave destruction with these channel-varying slopes (exemplified by FIG. 8).

Figure 6:
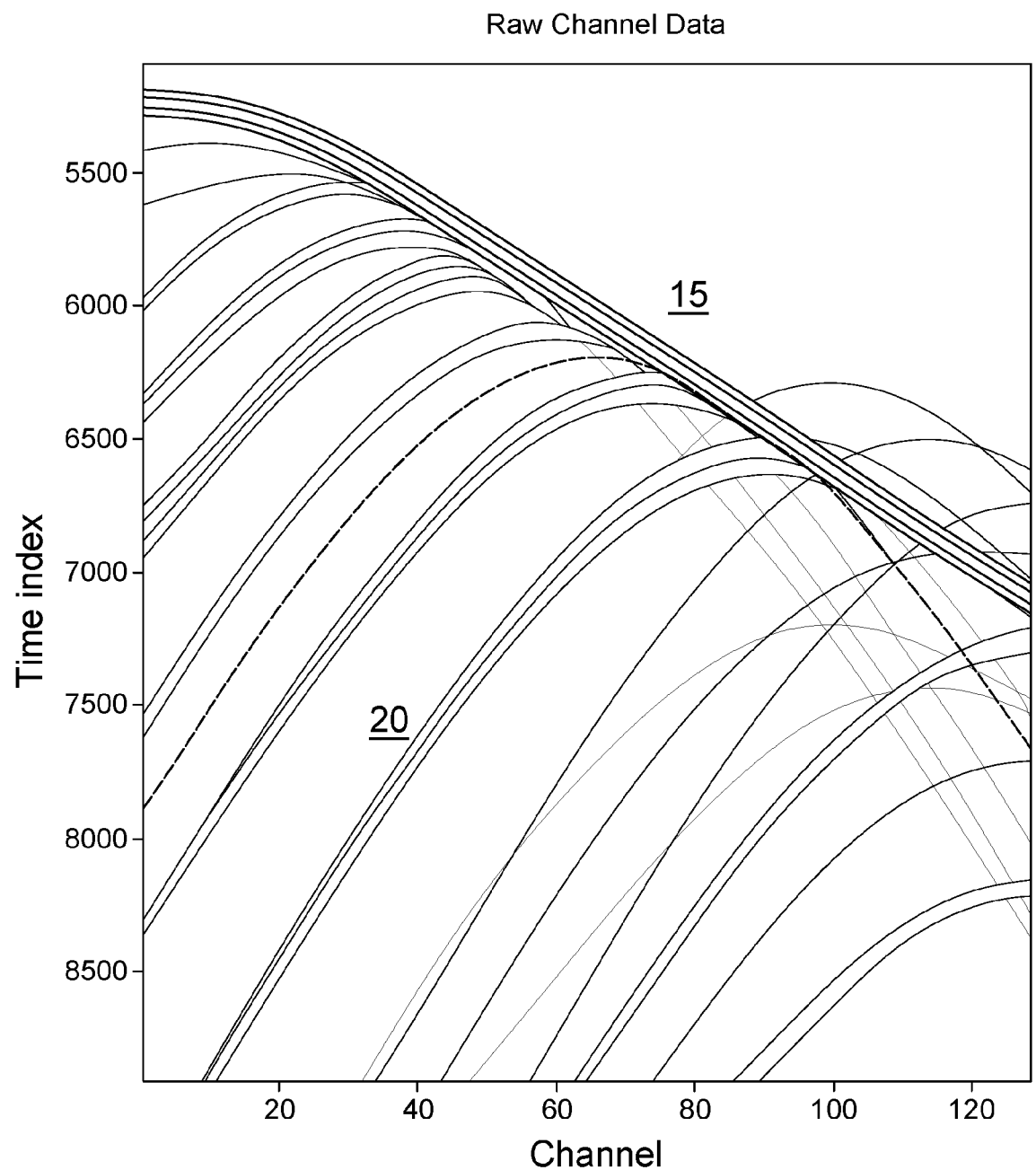
FIG. 6 is a plot of raw channel data.
Figure 7:
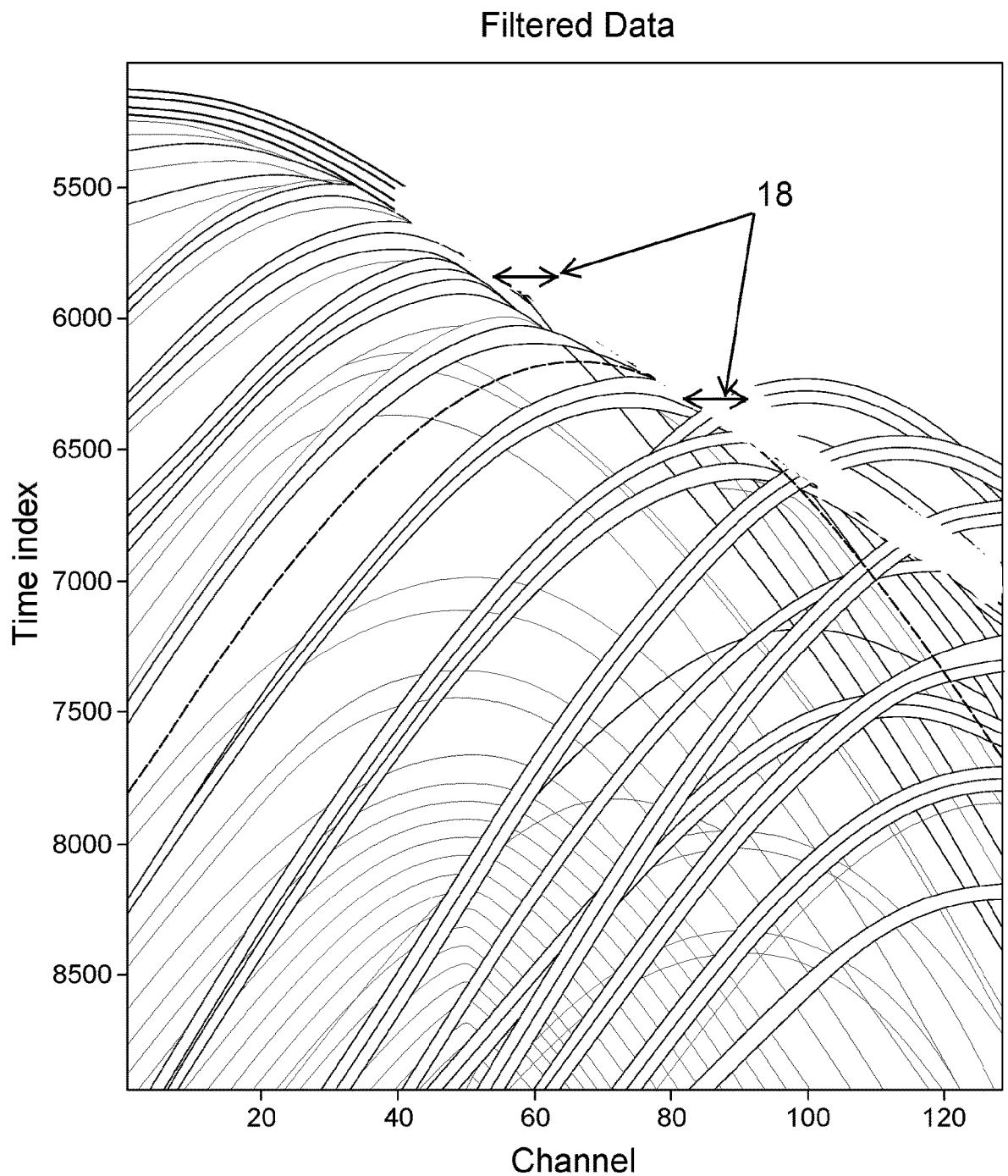
FIG. 7 is a plot of channel data filtered by a brightness threshold.

FIG. 6 provides a chart of unfiltered intensity data for time samples vs channel number. Here the parabolic curves represent weak diffuse reflections 20 and the diagonal stripes are from the specular reflections 15 that should be filtered out. The signals to be filtered can be seen as a filter band 18 that slides across channels for different sample times in FIG. 7. FIG. 7 shows signal intensity with the specular reflections filtered out. Channels are the circuit equivalent of the transducer elements and are used interchangeably when referring to data and signals.

Figure 5:
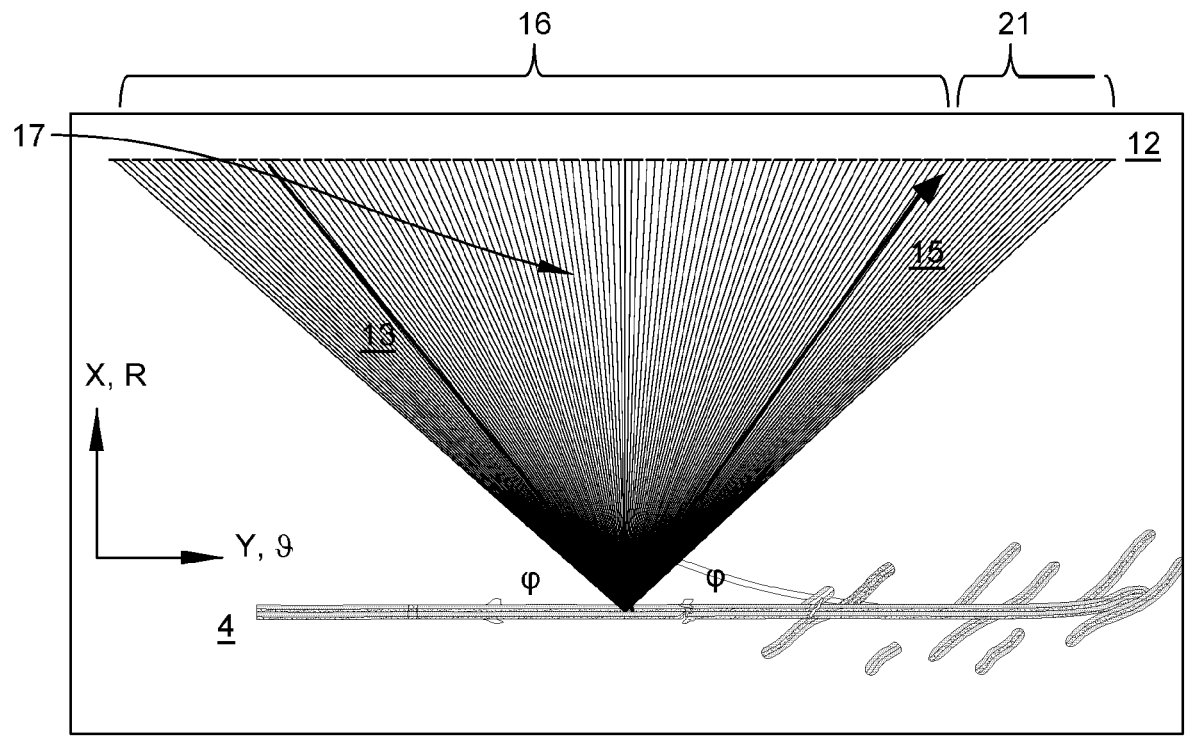
FIG. 5 is an illustration of tracing rays from a point on the object's surface.

FIG. 5 illustrates a ray tracing approach for filtering, in which the processor calculates all paths omnidirectionally reflected from a particular point on surface 4 back to the array. These rays 17 are captured by the transducer elements at slightly different times depending on the ray's length (i.e., time-of-flight). Transmitted wave 13 and specular wave 15 are indicated by thick arrows for reference, in particular to show that an aperture of transducer elements 21 (and their corresponding receive channels) will capture specular reflections. Transducer elements 16 (and their corresponding receive) will capture diffuse reflections. In fact, the apertures 16 and 21 will change dynamically during the receive phase.

Compression and shear components will arrive later than shown in FIG. 7. These times may be computed using ray tracing as taught in GB2115164.2 "Ultrasonic Inspection of Complex Surfaces" filed 21 Oct. 2021.

A known incident waveform (e.g., plane wave or diverging wave) will result in a known transmit angle at every point in the domain of interest. This transmit-angle map can be obtained either analytically or via ray-tracing followed by interpolation. At each point in the domain of interest, the processor is able to calculate the angle of specular reflection through law of reflection. Assuming the object's surface 4 is a flat reflector, parallel to the transducer's longitudinal axis, the angle of specular reflection φ is equal to the angle of incidence as provided by the aforementioned transmit-angle map. In FIG. 5, transducer 12 is parallel to surface 4. For more complex geometry, a more complex transmit-angle map will be calculated and stored. During the process of beamforming, contributions from transducer elements and times which correspond to specular reflections can be ignored, yielding an image which contains no reflectors, only diffuse or diffracting scatterers.

Figure 10:
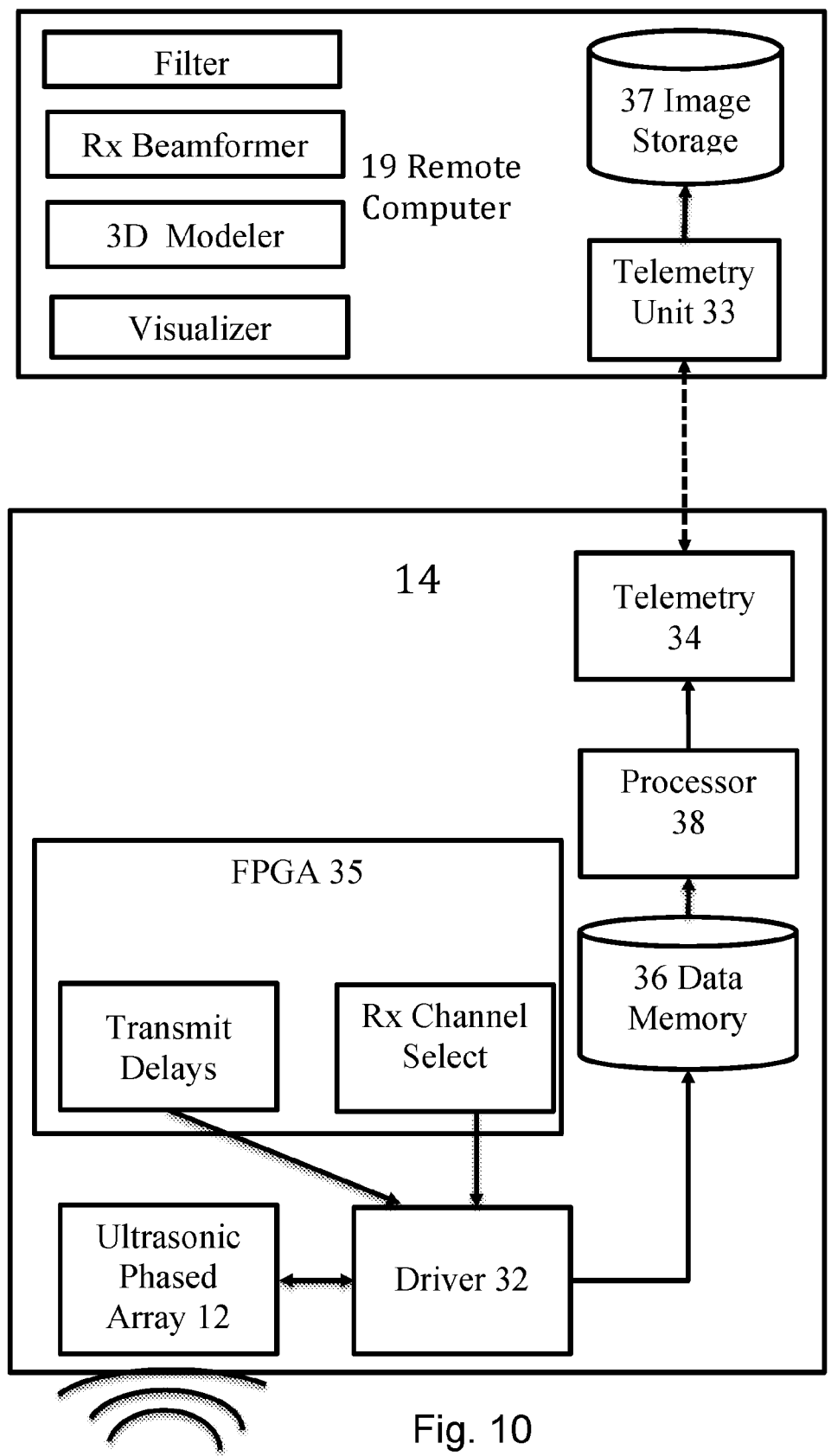
FIG. 10 is a circuit block diagram for processing ultrasonic data.
Figure 11:
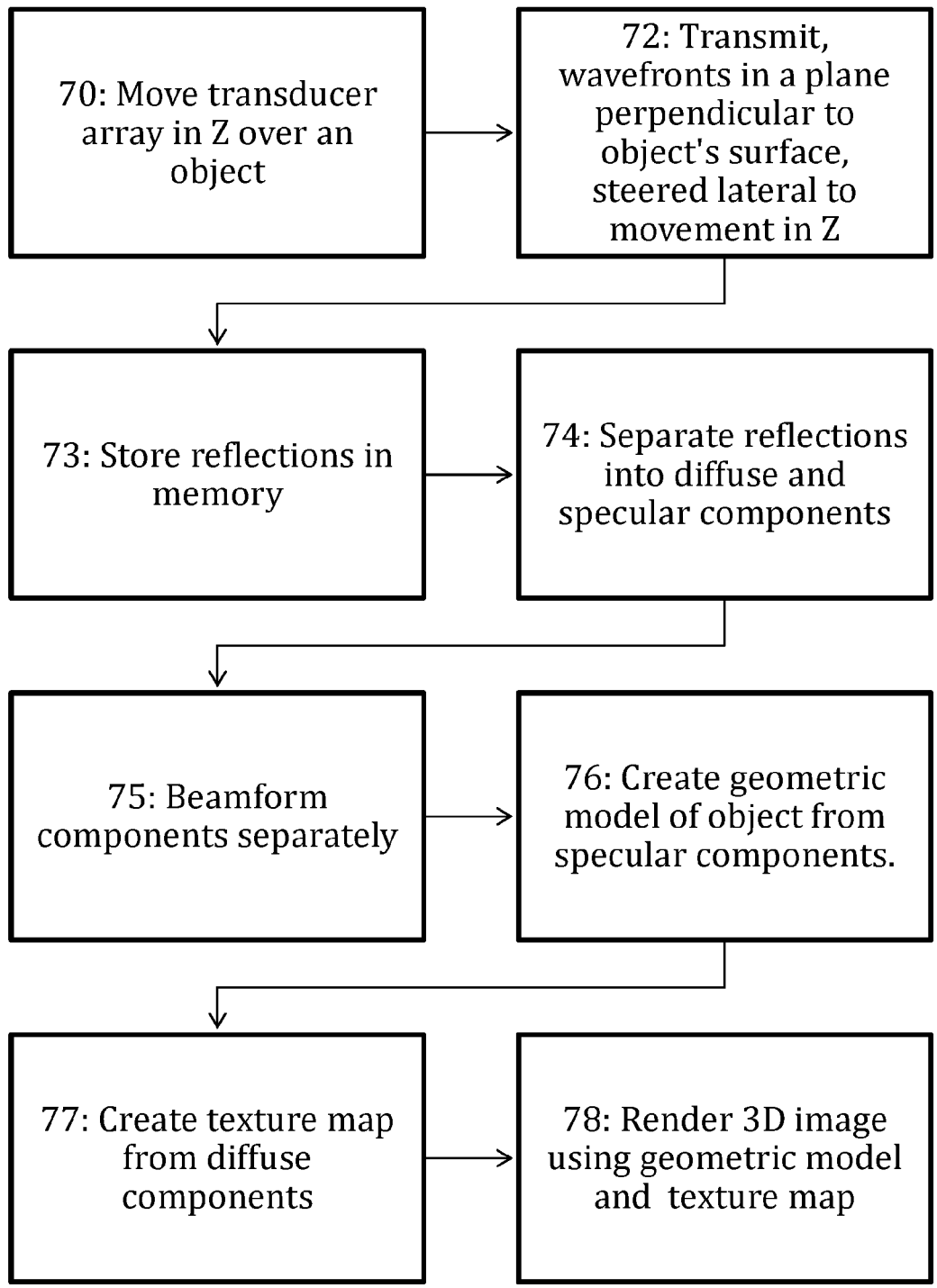
FIG. 11 is a flow diagram for processing ultrasonic data.

In post-processing, the ray tracing is used by the computing system 19 (as shown in FIG. 10) to sample and combine signals during the receive beamforming step. That is, all the elements in the diffuse that receive aperture 16 contribute to the signal intensity for that spot on the object's surface but for slightly different sample times. The remaining aperture 21 represents those rays that are too close in time and space to the specular ray. To get surface texture only, these specular rays can be filtered out/attenuated in the receive beamforming step.

In real-time, the device processor may determine the specular receive aperture 21 ahead of time and electronically deselect the corresponding channels during the receive window. Therefore, no data need be saved for these channels, if only diffuse data is wanted. Alternatively, the signals from these channels could be attenuated electrically before storing. More precisely, these filtered channels change in time and so a sliding band could be calculated.

Alternatively, the surface signals may be identified by the processor using image processing, looking for pixel values of high intensity. Raw reflection signals in memory are processed quite differently to extract the image. This algorithm may exclude the brightest signal (i.e. above a threshold) that should correspond to the specular reflection, and then use the remaining signals for the texture map.

In the channel data domain, shown in FIGS. 6 and 7, specular reflections have moveouts (i.e., time delay variation along the transducer array) that are generally different from diffuse waveforms. In the case of a plane wave of angle $\varphi$ incident on a flat reflector, the moveout $t_R$ is equal to $$t_R = \frac{2}{vel} * (Y_E \sin\varphi + X_R \cos\varphi)$$

where vel is the Speed of Sound, $X_R$ is the reflector depth, YE is the position of the transducer element (assuming that the first element injects the first pulse at t=0). In the channel data, reflected waves have a linear moveout. Diffuse reflections on the other hand, have hyperbolic moveout, tD, equal to:

Diffuse reflections on the other hand, have hyperbolic moveout, $t_D$, equal to:

$$t_D = \frac{Y_D \sin\varphi + X_D \cos\varphi}{vel} + \frac{\sqrt{(Y_D - Y_E)^2 + X_D^2}}{vel}$$

where $(Y_D, X_D)$ is the position of the diffuse reflector.

Consequently, whereas specular reflections appear as lines in the channel data, diffuse reflectors appear as hyperbolas. Either using the known inclination of these lines or using methods to estimate them, one can employ methods such as Hough transform, Radon transform, or plane wave destruction to filter these events.

The plane wave destruction filter is of particular use because of its flexibility. After the inclination as given by $\varphi$ is obtained (for example using linear semblance analysis) one can apply the following filter, described in the Z transform domain as $$H_\varphi(x, t) = z_x(bz_t^{-1} + 1 + bz_t) - (a_1 z_t^{-1} + 2b + a_{-1} z_t)$$

$$b = \frac{\cos^2\varphi - \sin^2\varphi}{2}$$

-continued $$a_1 = \frac{(\cos\varphi + \sin\varphi)^2}{2}$$

$$a_{-1} = \frac{(\cos\varphi - \sin\varphi)^2}{2}$$

where $z_t$ denotes a single-sample time-shift operator, $z_x$ denotes a single-sample space-shift operator. If u(x, t) is the channel data, then the application of the filter in Z domain is simply $H_\varphi(x, t)u(x, t)$. FIG. 9 is a plot of channel data filtered by single preferential slope for plane-wave destruction.

The plane wave destruction filter is particularly useful when the geometry of reflectors is unknown. In this case, specular reflectors may not appear as lines anymore, but diffuse reflections will still have hyperbolic moveout, in addition to still having lower amplitude than specular reflections. Under these assumptions, it is possible to construct a new plane-wave destruction filter $H_{\varphi(x)}(x, t)$ where now $\varphi(x)$ is describes an optimal inclination for each channel, constructed such that $\Sigma_x \|\varphi(x)(x, t)u(x, t)\|$ is minimized, that is, such that the filter removes as much energy as possible. Assuming that specular reflectors are the strongest, this filter keeps only diffuse reflections.

Figure 8:
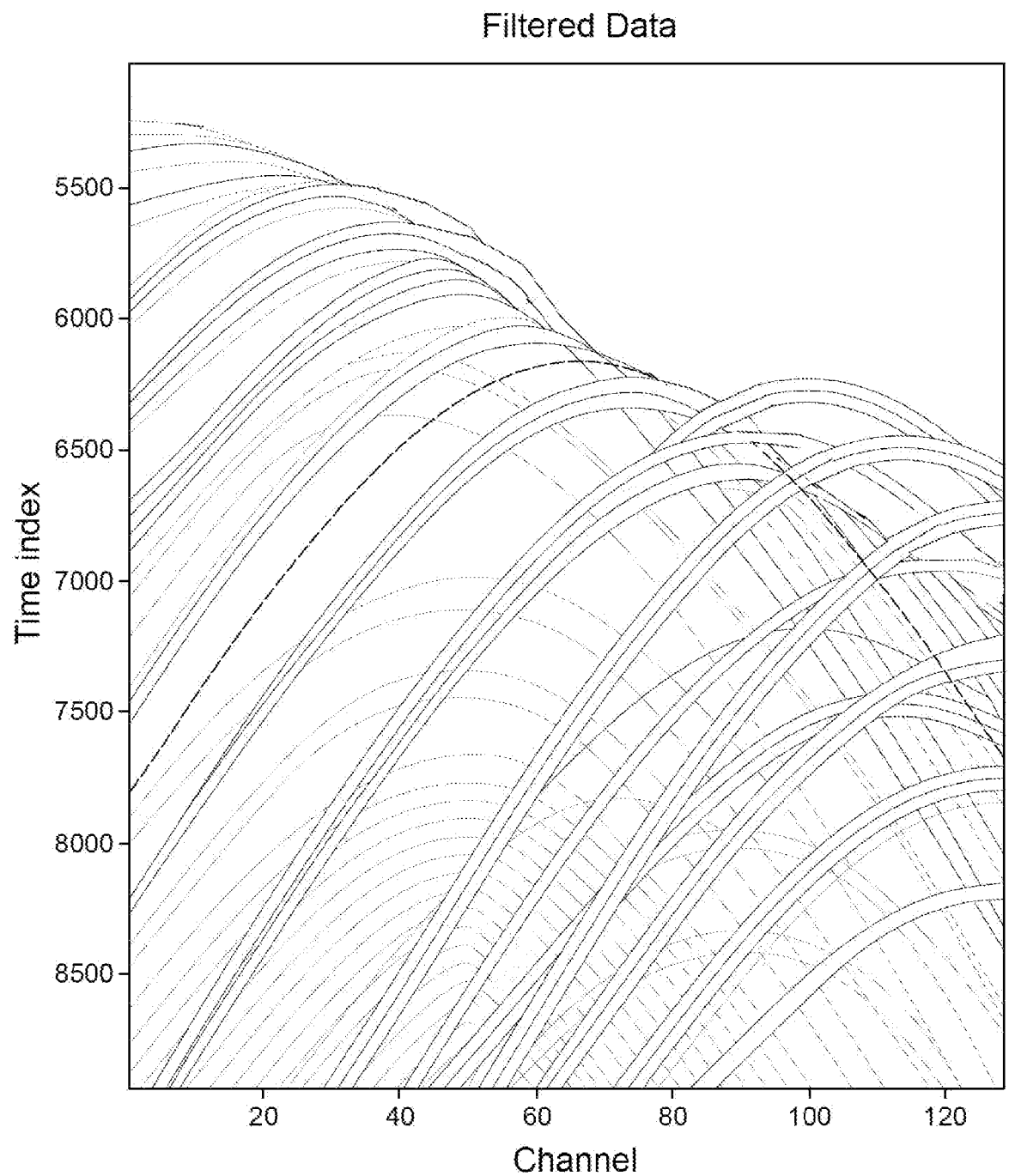
FIG. 8 is a plot of channel data filtered by cross-correlation approach for plane-wave destruction.

FIG. 8 illustrates another way to construct $\varphi(x)$ without minimization is to cross-correlate neighboring channels to obtain the time-lag between them, expressed as fractions of time-samples. Using the known pitch of the elements, this can be converted into a slope, that is, tan $\varphi(x)$.

More advanced embodiments may use machine learning to more precisely identify the filter parameters and apply it to the dataset.

Upon identification and filtering of these events, either standard beamforming or specular-reflection-filtered beamforming can be applied to the dataset, yielding an image which contains no specular reflectors, only diffuse or diffracting scatterers.

Transducers

The phased array 12 comprises a plurality of acoustic transducer elements, preferably operating in the ultrasound band, preferably arranged as an evenly spaced one-dimensional array (see FIGS. 1, 3D). The frequency of the ultrasound waves generated by the transducer(s) is generally in the range of 200 kHz to 30 MHz. The transducers may be piezoelectric, such as the ceramic material, PZT (lead zirconate titanate). Such transducers and their operation are well known and commonly available. Circuits 14 as shown in FIG. 10 to drive and capture these arrays are also commonly available.

The number of individual elements in the transducer array affects resolution and may be 32 to 2048 elements and preferably 128 to 1024 elements. The transducer 12 may be distributed radially, equidistant around the body of the device for inspecting cylindrical objects or they may be generally straight for inspecting planar objects.

This transducer arrangement captures a cross-sectional slice of the object to create an ultrasound frame and as the device is moved axially in the Z direction, these slices are combined to create a 3D geometric model of the object.

While tilting the transducer face towards the direction of the relative device-object movement would capture surface details, as taught in US20200249203, entitled "Acoustic surface imaging using time of flight", there would be less depth penetration. Such tilting is illustrated by transducer 12 in FIG. 2.

The present device improves energy penetration by arranging the transducer elements facing normal to the object surface, as illustrated by FIG. 3A—that is, transducers are not tilted relative to the surface of the object. The corresponding curved object case is illustrated by FIG. 3D.

Advantages and Use Cases

The present method and devices may be used to image a wide variety of industrial objects, where surface texture and depth data are of interest. The object is typically a manufactured part that is being inspected after manufacture or after some service in the field. Surface marks and internal defects provide some indication of wear, manufacturing problems, and stresses.

By way of example, the object may be a pipeline, inspected by PIGs during In-line Inspection, a wellbore (inspected by a downhole tool), an aircraft wing, a railway track, or other manufactured part (commonly inspected with Non-Destructing Testing (NDT) tool). In these applications, the tool is drawn through or across the object in a generally continuous direction Z. These tools would normally need to be twice as large as the present tool to capture both depth and surface reflections.

For In-line Inspection (ILI), the tool 1 form factor is a plurality of large, connected cylinders (see FIG. 1) that is propelled by fluid pressure in the Z dimension. Similarly, for well inspection, the tool's form factor is a long cylinder (see FIG. 2) that is conveyed by wireline, tractor, or coiled tubing. The circumferentially distributed, outwardly facing transducers 12 capture an ultrasonic image as a slice in the R, θ plane.

For NDT, the tool may be moved by a manipulator or handheld/hand propelled across the surface of the object in the Z dimension. The tool may also be held in a stationary jig, while the target object moves relative to it on a conveyor. FIG. 3A shows object 2 moving relative to stationary transducer 12.

Computer System

FIG. 10 illustrates computing components for the device and remote system. There is a circuit 14 on the device having: a data memory 36 for storing ultrasound images; drivers 32 for pulsing transducer elements and receiving reflections; FPGA 35 for controlling transmission delays of the phased array and selecting receive channels; tool processor 38 for running instructions and a telemetry unit 34 for sending images to a corresponding telemetry unit of the surface computer system.

Figure 12:
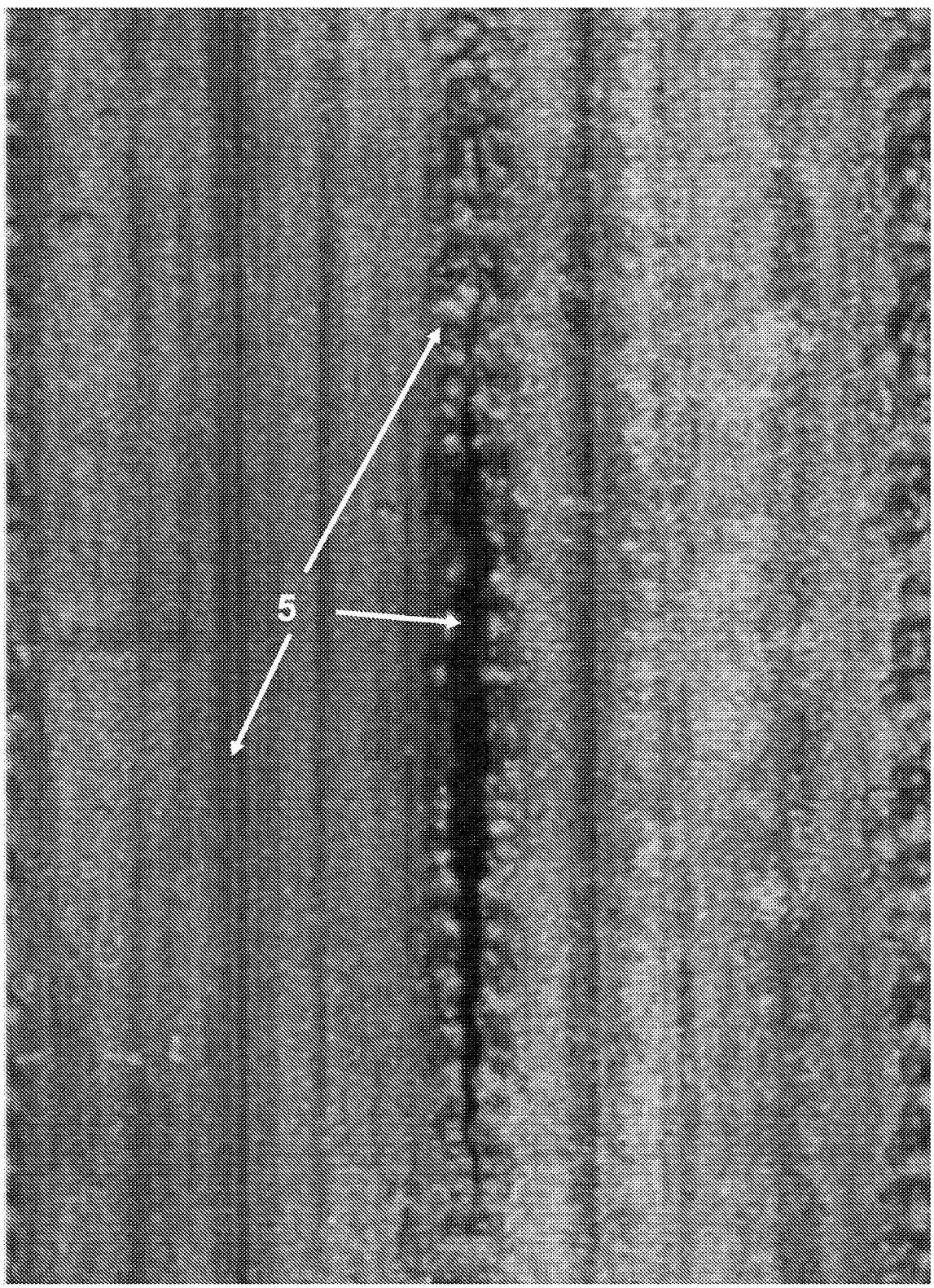
FIG. 12 is an ultrasound image rendered to show a surface texture of an object.

Image processing may occur on the device computer so that a fully rendered image may be provided directly to the user. FIG. 12 is an example rendering of an ultrasound image from the present process, highlighting certain surface features 5. This allows for real-time inspection using a handheld NDT device. Alternatively, the image processing can be done on a computing system 19 that is separate from the device, which allows for much greater computer power and memory. Such a computing system may be a cloud computing resource.

The remote computing system 19 provides memory 37, processor, and software modules for receiving beamforming, filtering, 3D modelling, and visualization of the object to a display.

Without loss of generality, each of these components may comprise multiples of such components, e.g., the memory may be multiple memory chips. For the sake of computing efficiency, several of the functions and operations described separately above may actually be combined and integrated within a chip. Conversely, certain functions described above may be provided by multiple chips, operating in parallel.

The term 'processor' is intended to include computer processors, cloud processors, microcontrollers, firmware, GPUs, FPGAs, and electrical circuits that manipulate analog or digital signals. While it can be convenient to process data as described herein, using software on a general computer, many of the steps could be implemented with purpose-built circuits.

The invention claimed is:

1. A method of ultrasonic non-destructive testing an object, comprising the steps of:
    moving a phased array ultrasonic transducer relative to the object in a first direction;
    repeatedly transmitting a steered coherent wave towards the object using said transducer;
    receiving signals reflected from the object using said transducer and storing the received signals in memory;
    beamforming diffuse components of the received signals to determine pixel values for a surface of the object; and
    creating a texture map of the object based on said pixel values.

2. The method of claim 1, further comprising displaying a rendering of the object using the texture map.

3. The method of claim 1, further comprising filtering out or attenuating specular components of the stored received signals, preferably using a mask of receive channels and sample times that correspond to calculated specular angles of reflection.

4. The method of claim 1, further comprising excluding channels of said transducer corresponding to specular reflections during the step of receiving reflected signals.

5. The method of claim 1, further comprising beamforming specular components of the received signals to create a geometric model of the surface of the object.

6. The method of claim 1, further comprising beamforming and ray tracing compression and shear components of the received signals to detect defects in the object.

7. The method of claim 1, wherein the transducer is a linear array of ultrasonic elements whose longitudinal axis is substantially perpendicular to the first direction.

8. The method of claim 1, wherein the steered coherent wave is a defocused or diverging wave.

9. The method of claim 1, further comprising beamforming specular signals in the received signals to determine a geometry of said surface and using that determined geometry to identify locations of diffuse reflectors on said surface.

10. The method of claim 1, wherein beamforming diffuse components comprises tracing rays from said surface to the transducer, excluding specular rays.

11. The method of claim 1, wherein the coherent wave is steered at an angle between 12-25° off a Normal of the surface of the object, preferably steered at an angle 18-22°.

12. The method of claim 1, wherein a steering axis of the coherent wave is substantially orthogonal to the first direction.

13. The method of claim 1, wherein the coherent wave is transmitted in a plane substantially orthogonal to the first direction.

14. The method of claim 1, wherein a transmission face of the transducer is normal to said surface of the object.

15. The method of claim 1, further comprising transmitting a plurality of additional coherent waves that are normal to the surface of the object and processing their reflections to create a geometric model of the object.

16. A system for ultrasonic non-destructive testing an object, the system comprising:
    a housing mounting a phased array ultrasonic transducer;

conveying means for moving the transducer relative to the object in a first direction;

a drive circuit electrically connected to the transducer and arranged to repeatedly transmit a steered coherent wave towards the object;

a receiving circuit for receiving signals reflected from the object using said transducer a memory for storing the received signals; and a processor for a) beamforming diffuse components of the received signals to determine pixel values for a surface of the object and b) creating a texture map of the object based on said pixel values.

17. The system of claim 16, wherein the receiving circuit stores an exclusion mask for excluding certain channels of said transducer corresponding to specular reflections.

18. The system of claim 16, wherein the transducer is a linear array of ultrasonic elements whose longitudinal axis is substantially perpendicular to the first direction.

19. The system of claim 16, wherein the coherent wave is steered at an angle between 12-25° off a Normal of the surface of the object, preferably steered at an angle 18-22°, preferably wherein a steering axis of the coherent wave is substantially orthogonal to the first direction.

20. The system of claim 16, wherein a transmission face of the transducer is normal to said surface of the object.

* * * * *